(12) United States Patent
Oka et al.

(10) Patent No.: US 8,503,737 B2
(45) Date of Patent: Aug. 6, 2013

(54) VISUAL LINE ESTIMATING APPARATUS (75) Inventors: Kenji Oka, Kanagawa (JP); Sotaro Tsukizawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 98 days.

(21) Appl. No.: 13/240,200

(22) Filed: Sep. 22, 2011

(65) Prior Publication Data

US 2012/0076438 A1 Mar. 29, 2012

Related U.S. Application Data (63) Continuation of application No. PCT/JP2010/007245, filed on Dec. 14, 2010.

(30) Foreign Application Priority Data

Sep. 27, 2010 (JP) .................................. 2010-215331

(51) Int. Cl.
*G06K 9/00* (2006.01)
(52) U.S. Cl.
USPC ........................................................ 382/117
(58) Field of Classification Search
USPC ........................................................ 382/117
See application file for complete search history.

(56) References Cited

U.S. PATENT DOCUMENTS

| | | | | |
|---|---|---|---|---|
| 7,391,887 B2 * | 6/2008 | Durnell | ........................ | 382/117 |
| 7,401,920 B1 * | 7/2008 | Kranz et al. | ................... | 351/210 |
| 8,150,118 B2 * | 4/2012 | Yamaguchi | ................... | 382/128 |
| 8,285,004 B2 * | 10/2012 | Matsuoka et al. | ............ | 382/117 |
| 2008/0089559 A1 * | 4/2008 | Koumura | ....................... | 382/117 |
| 2008/0136916 A1 * | 6/2008 | Wolff | ............................. | 348/169 |

FOREIGN PATENT DOCUMENTS

| | | |
|---|---|---|
| JP | 07-096803 A | 4/1995 |
| JP | 10-276987 A | 10/1998 |
| JP | 2004-334784 A | 11/2004 |
| JP | 2007-268164 A | 10/2007 |
| JP | 2007-301087 | * 11/2007 |
| JP | 2007-301087 A | 11/2007 |
| JP | 2009-181424 A | 8/2009 |

OTHER PUBLICATIONS

International Search Report for PCT/JP2010/007245 dated Sep. 27, 2010.

* cited by examiner

*Primary Examiner* — Wesley Tucker
(74) *Attorney, Agent, or Firm* — Pearne & Gordon LLP (57) ABSTRACT The visual line estimating apparatus 200 comprises: an image inputting section 201 operable to take an image of a human; a visual line measurement section 202 operable to measure a direction of a visual line on the basis of the taken image; a visual line measuring result storing section 211 operable to store therein visual line measuring results previously measured; a representative value extracting section 212 operable to extract a previous representative value; and a visual line determining section 213 operable to judge whether or not a difference between the representative value and the visual line measuring result is lower than a predetermined threshold to determine a visual line estimating result from the representative value and the visual line measuring result.

8 Claims, 10 Drawing Sheets

IRIS   PUPIL   SCLERA
(WHITE PART OF THE EYE)

IRIS   PUPIL   SCLERA
(WHITE PART OF THE EYE)

VISUAL LINE ESTIMATING APPARATUS

TECHNICAL FIELD

The present invention relates to a visual line estimating apparatus for estimating a direction of a human visual line from an image of a region about a human face taken by an imaging apparatus, and more particularly to a visual line estimating apparatus comprising a function to estimate the direction of the visual line with high accuracy, even if visual line measuring results obtained by a visual line measurement apparatus have errors, by smoothing the visual line measuring results.

BACKGROUND ART

In recent years, there have so far been proposed a wide variety of systems designed to estimate the direction of the visual line of the driver on the basis of an image of a region about a driver's face taken by a vehicle-mounted camera mounted in a vehicle, and detect an inattentive driving state of the driver on the basis of the estimated direction of the visual line to alert the driver. These systems are needed to estimate the direction of the visual line with high accuracy.

The visual line estimating apparatuses fall into two broad categories. In one category, the visual line estimating apparatus is designed to estimate the visual line on the basis of an image of a region zoomed in an eye. In other category, the visual line estimating apparatus is designed to estimate the visual line on the basis of an image of the region including the whole face taken in wide angle.

The visual line estimating apparatus designed to estimate the visual line on the basis of the image of the region zoomed in the eye is capable of estimating the visual line with high accuracy, but has the drawback of failing to estimate the visual line at the time of moving a head. Therefore, the visual line estimating apparatus is not appropriate to estimate the visual line of the driver.

In contrast, the visual line estimating apparatus designed to estimate the visual line on the basis of the image of the whole face taken in wide angle is capable of estimating the visual line even if the head is moved relatively free. Therefore, the visual line estimating apparatus is appropriate to estimate the visual line of the driver. However, the visual line estimating apparatus has a characteristic that the accuracy of estimating the visual line is tended to be low by the reason that the image corresponding to an eye region has low number of pixels and low resolution.

In general, the visual line estimating apparatus designed to estimate the visual line on the basis of the image of the whole face taken in wide angle is adapted to estimate the direction of the human visual line by detecting the center of a human pupil in the taken image. In this case, false detection of the pupil frequently occurs at a low luminance part about the eye region by the reason of the low resolution of the eye region.

This results in the fact that many significant errors by the false detection of the pupil are included in the visual line measuring results. This leads to the fact that the visual line measuring results should not be directly outputted for estimating the direction of the visual line with high accuracy. Accordingly, the visual line measuring results are needed to be smoothed to remove the influence of the errors.

Therefore, techniques for smoothing the visual line measuring result with some kind of signal processing technology have been conventionally provided. For example, the conventional technology performing a smoothing operation with using wavelet analysis to obtain the visual line estimating result with high accuracy is provided (see, for example, Patent Literature 1).

CITATION LIST

Patent Literature

[PTL 1]
Patent Literature 1: Japanese Patent No. 3760960

SUMMARY OF INVENTION

Technical Problem

However, the technology described above encounters such a problem that the smoothing is insufficient in case that the significant errors are included in the visual line measuring results. In detail, according to analyzing the false detection of the pupil really occurred, the false detection of the pupil is almost occurred at the position apart from the center position of the pupil such as, for example, a position of a tail of the eye or a position on an outline of an iris at the frequency of once per several frames.

Figure 13:
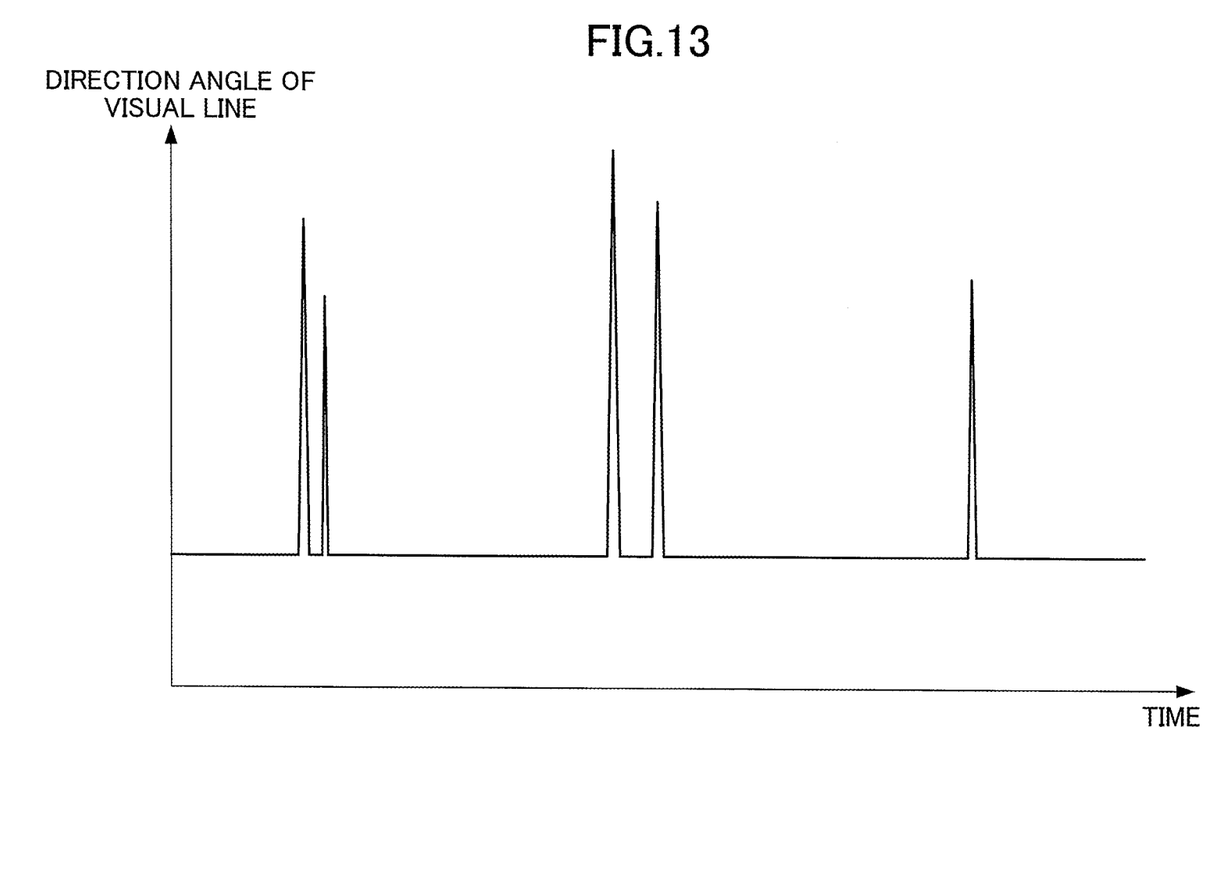
FIG. 13 is a graph showing a general visual fine measuring results.

As shown in FIG. 13, the visual line measuring results are shown like a surge current. Accordingly, the smoothing operation with high accuracy can not remove the significant errors from the visual line measuring results, thereby the accuracy of the visual line estimating result falls low.

Additionally, in case that the smoothing operation is performed, the smoothed visual line measuring result is often delayed for several frames with respect to a real measuring result. This results in a problem of a deterioration of a real-time performance.

It is, therefore, a subject of the present invention to provide a visual line estimating apparatus which can obtain the high accurate visual line estimating result with the suppressed errors without delay, even if the visual line measuring result includes the significant errors caused by the false detection of the pupil as shown in FIG. 13.

Solution to Problem

According to a aspect of the present invention, there is provided a drive assist display apparatus comprising: an image inputting section operable to take an image of a region including an eye on a face; a visual line measurement section operable to measure a direction of a visual line on the basis of the taken image; a visual line measuring result storing section operable to store therein visual line measuring results previously measured by the visual line measurement section; a representative value extracting section operable to extract a representative value from the visual line measuring results stored in the visual line measuring result storing section; and a visual line determining section operable to judge whether or not a difference between the representative value extracted by the representative value extracting section and the visual line measuring result measured by the visual line measurement section is lower than a predetermined threshold T to determine a visual line estimating result from the representative value and the visual line measuring result.

In accordance with the above construction, the drive assist display apparatus according to the present invention is designed to determine the visual line measuring result as the visual line estimating result in case that the difference D between the visual line measuring result and the representative value is lower than the predetermined threshold T, and determine the representative value as the visual line estimating result in case that the difference D is higher or equal to the predetermined threshold T. The drive assist display apparatus can therefore obtain the high accurate visual line estimating result with the suppressed errors without delay, even if the visual line measuring result includes the significant errors caused by the false detection of the pupil.

The drive assist display apparatus may further comprises a threshold determining section operable to determine the threshold T, wherein the threshold determining section is operable to determine the threshold T between a maximum eyeball rotation angle P and a minimum angle Q after setting the maximum eyeball rotation angle P indicating a possible travel angle of the visual line in a time period of a frame and setting the minimum angle Q indicating an angular difference D between the visual line at the time of detecting a true pupil and the visual line at the time of detecting a false pupil outside of a region of the true pupil.

In accordance with the above construction, the drive assist display apparatus according to the present invention can determine the appropriate threshold T used for selecting from the visual line measuring result and the representative value. The drive assist display apparatus can therefore stably obtain the visual line estimating result with high accuracy.

The threshold determining section may be adapted to set the maximum eyeball rotation angle P on the basis of a known value corresponding to an elastic speed of a muscle controlling eye movement.

In accordance with the above construction, the drive assist display apparatus according to the present invention can shorten the time required to determine the threshold T by the reason that the maximum eyeball rotation angle P referred for determining the threshold T is treated as a constant value.

The threshold determining section may be adapted to adjust the maximum eyeball rotation angle P on the basis of the previous results outputted from at least one of the visual line measurement section and the visual line determining section.

In accordance with the above construction, the drive assist display apparatus according to the present invention can improve the accuracy of the maximum eyeball rotation angle P by the reason that the maximum eyeball rotation angle P is adjusted on the basis of at least one of the visual line measuring result and the visual line estimating result.

The threshold determining section may be adapted to set the minimum angle Q on the basis of the maximum eyeball rotation angle P and an angle between a line from a center of the pupil to a center of the eyeball and a line from a point on an outline of an iris to the center of the eyeball.

In accordance with the above construction, the drive assist display apparatus according to the present invention can set the minimum angle Q referred for determining the threshold T.

The representative value extracting section may be operable to extract a center value of the visual line measuring results stored in the visual line measuring result storing section as the representative value.

In accordance with the above construction, the drive assist display apparatus according to the present invention can obtain the visual line estimating result with the suppressed errors without delay, even if the visual line measuring result includes the significant errors.

The threshold determining section may be adapted to calculate an iris radius and calculate the angle between the line from the center of the pupil to the center of the eyeball and the line from the point on the outline of the iris on the basis of the calculated iris radius to the center of the eyeball.

In accordance with the above construction, the drive assist display apparatus according to the present invention can stably obtain the visual line estimating result with high accuracy, even if the iris radiuses vary in drivers.

The drive assist display apparatus may further comprise an irradiating section operable to irradiate the region including the eye on the face, wherein the threshold determining section is operable to have the irradiating section change the state of irradiating at the time of calculating the iris radius.

In accordance with the above construction, the drive assist display apparatus according to the present invention can obtain a stable luminance face image and calculate the iris radius on the basis of the image of the driver under the condition to be received only natural light including much visible light.

The drive assist display apparatus may further comprise a time-series filter operable to smooth the value determined by the visual line determining section.

In accordance with the above construction, the drive assist display apparatus according to the present invention can obtain the high accurate visual line estimating result with the suppressed errors.

Advantageous Effect of Invention

The present invention provides a drive assist display apparatus which can obtain the high accurate visual line estimating result with the suppressed errors without delay, even if the visual line measuring result includes the significant errors caused by the false detection of the pupil.

DESCRIPTION OF EMBODIMENTS

The embodiments of the present invention will be described hereinafter with reference to the drawings. In the embodiments, the same constituent element is assigned the same reference sign to omit repeated explanation.

First Embodiment

Figure 1:
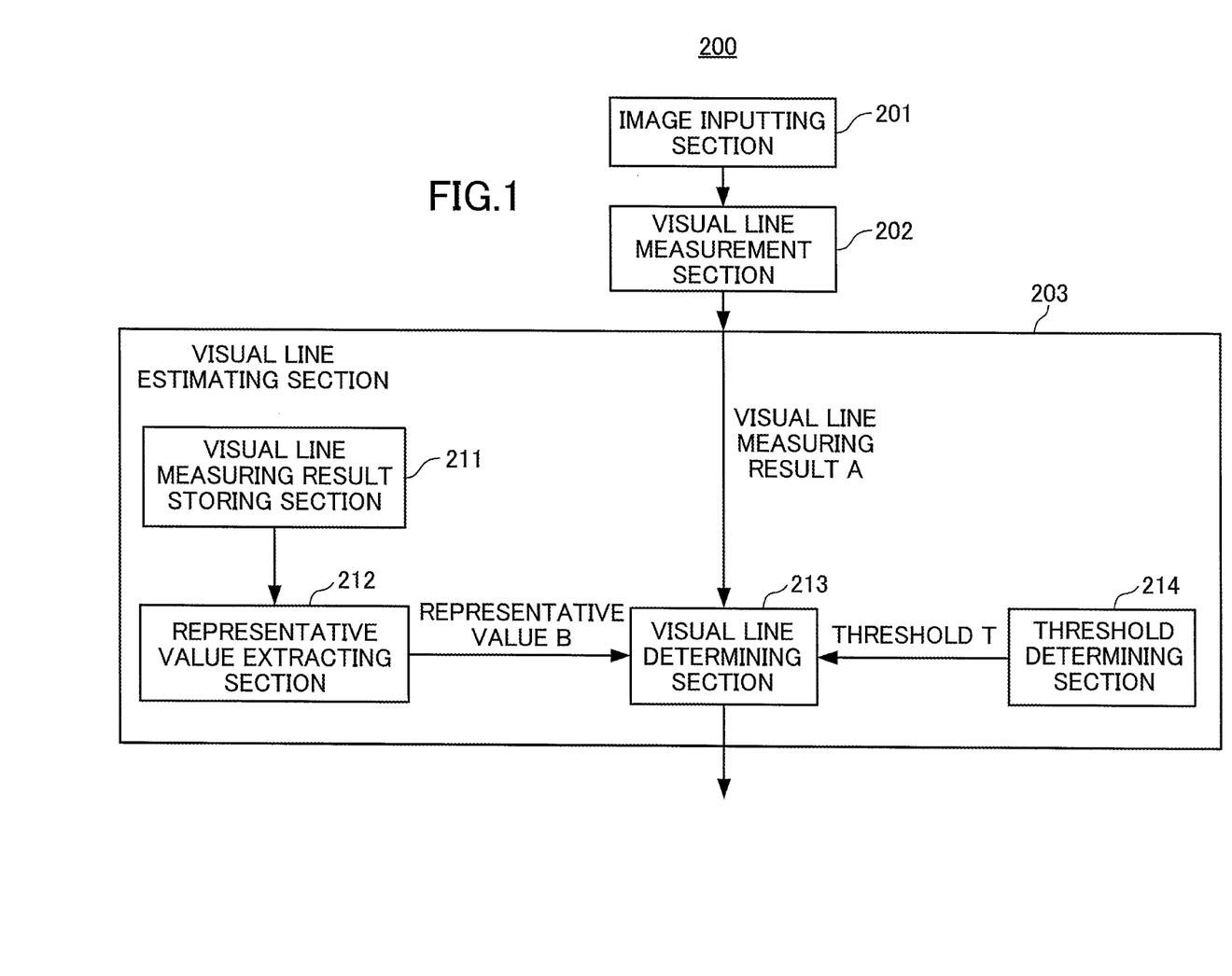
FIG. 1 is a block diagram showing a construction of a visual line estimating apparatus according to a first embodiment of the present invention.

FIG. 1 is a block diagram showing a construction of a visual line estimating apparatus 200 according to the first embodiment of the present invention. The visual line estimating apparatus 200 is mounted in an interior of a vehicle for example and connected to an alert device outside of the visual line estimating apparatus 200. The alert device is adapted to alert a driver when judging on the basis of a visual line estimating result by the visual line estimating apparatus 200 that the driver does not face the front over a long period of time.

As shown in FIG. 1, the visual line estimating apparatus 200 comprises an image inputting section 201 operable to take an image of a region about a face of the driver, a visual line measurement section 202 operable to measure the direction of a visual line of the driver on the basis of the taken image of the region about the face of the driver, and a visual line estimating section 203 operable to estimate the direction of the visual line of the driver by smoothing visual line measuring results indicating the measuring results of the visual line measurement section 202.

The image inputting section 201 is constituted by an imaging apparatus having an image sensor such as, for example, CCD (Charge Coupled Devices) or CMOS (Complementary Metal Oxide Semiconductor), and operable to take an image of a forward object. The image inputting section 201 is mounted on the specific place such as, for example, a steering wheel or a dashboard of the vehicle to take the image of the region about the face of the driver.

The visual line measurement section 202 and the visual line estimating section 203 are constituted by an electronic control unit comprising a processor such as, for example, a CPU (Central Processing Unit) or a DSP (Digital Signal Processor), a RAM (Random Access Memory), a ROM (Read Only Memory) and an Input/Output interface.

The ROM is stored therein an program to make the electronic control unit function as the visual line measurement section 202 and the visual line estimating section 203. In other words, the electronic control unit functions as the visual line measurement section 202 and the visual line estimating section 203 by the processor executing the program stored in the ROM with using RAM as work area.

The visual line measurement section 202 is operable to measure the direction of the visual line of the driver at the time of taking the image on the basis of a face image of the region about the face of the driver taken by the image inputting section 201. An example of the measurement of the direction of the visual line by the visual line measurement section 202 will be explained hereinafter.

Figure 2:
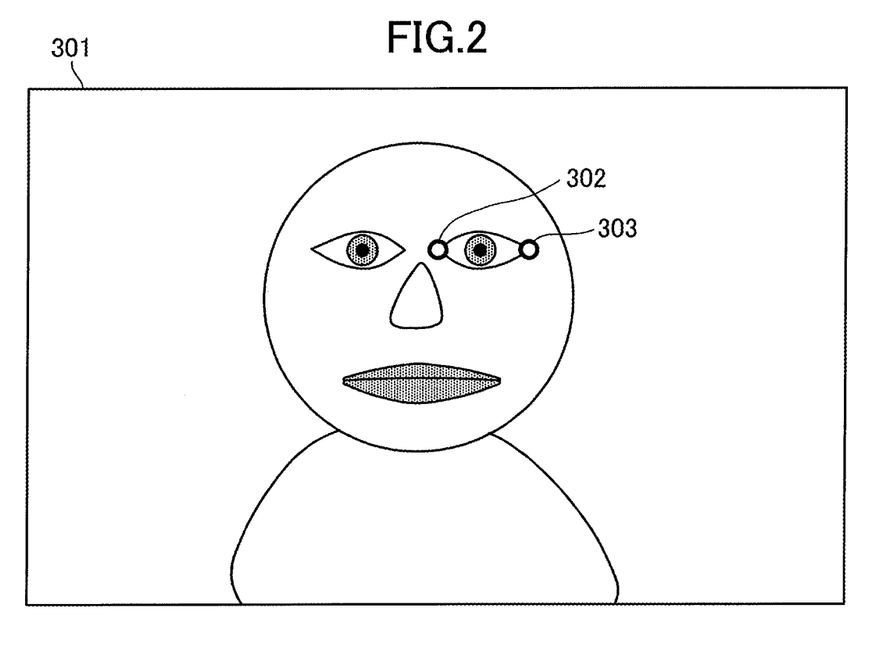
FIG. 2 is a conceptual diagram showing a face image as an inputted image of a visual line measurement section constituting the visual line estimating apparatus according to the first embodiment of the present invention.

As shown in FIG. 2, the visual line measurement section 202 is adapted to detect edges 302, 303 of at least one of eyes from a face image 301 taken about the region of the face of the driver. For example, the visual line measurement section 202 preliminarily possesses a standard image of the edges of the eye as a template image. The visual line measurement section 202 is adapted to detect the edges 302, 303 of the eye by searching in the face image 301 on the basis of the template image.

Figure 3:
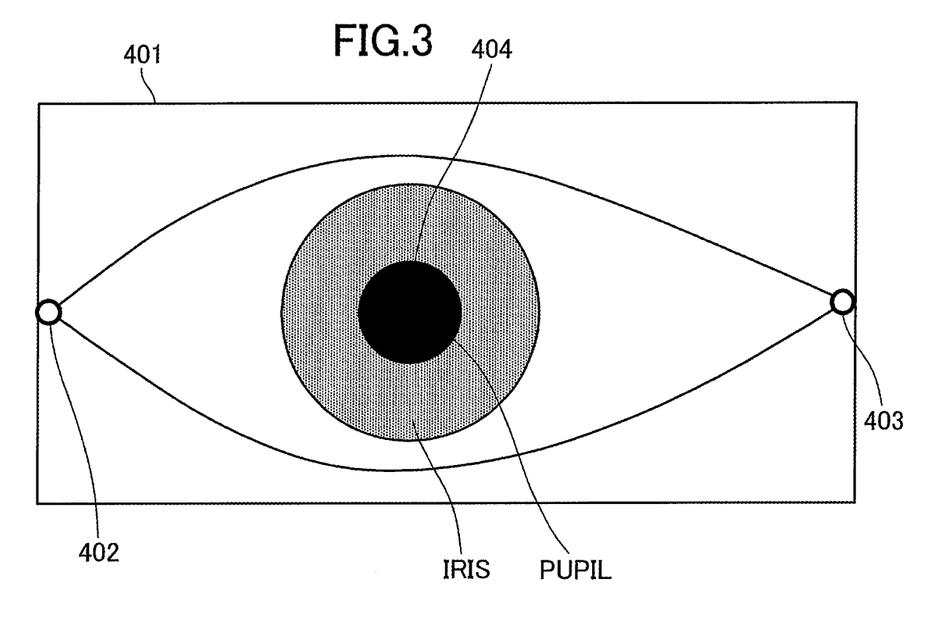
FIG. 3 is a conceptual diagram showing an image of an the eye region trimmed and expanded from the inputted image of the visual line measurement section constituting the visual line estimating apparatus according to the first embodiment of the present invention.

In addition, the visual line measurement section 202 is adapted to clip an rectangle formed by sides passing on the edges 302, 303 and having a size in response to the distance between the edges 302, 303 of the eye, and adapted to expand the rectangle to obtain an eye region image 401 as shown in FIG. 3. In FIG. 3, the visual line measurement section 202 is adapted to detect a center 404 of a pupil from the eye region image 401. The center of the pupil is hereinafter simply referred to as "pupil center".

For example, the visual line measurement section 202 is adapted to extract the pixels low in luminance among the pixels of the eye region image 401, group the extracted pixels into candidate pupil regions, calculate the areas of the candidate pupil regions, select the pupil region having the most similar area to a predetermined pupil area from the candidate pupil regions, and detect the center of the selected pupil region as the pupil center 404.

The visual line measurement section 202 is adapted to detect the direction of the visual line on the basis of edges 402, 403 of the eye and the pupil center 404 in the eye region image 401. For example, the visual line measurement section 202 is adapted to detect a horizontal direction angle of the visual line on the basis of a degree of deviation of the pupil center 404 with respect to the edges 402, 403 of the eye from side to side.

The visual line measurement section 202 may adapted to store therein positional relationships between the edges 402, 403 of the eye and the pupil center 404 in each of the eye region images 401 so as to calculate more accurately the direction angle of the visual line. The eye region images 401 are obtained from the face images 301 taken by the image inputting section 201 for the driver's face oriented at a plurality of predetermined angles.

Some measuring results of the visual line measurement section 202 have significant errors as shown in FIG. 13. Therefore, the visual line estimating section 203 is operable to estimate the direction of the visual line of the driver after smoothing the visual line measuring results indicating the measuring results of the visual line measurement section 202. The visual line estimating section 203 is further adapted to output the estimating result to the alert device.

In FIG. 1, the visual line estimating section 203 comprises a visual line measuring result storing section 211 operable to store therein the visual line measuring results of the last several frames measured by the visual line measurement section 202, a representative value extracting section 212 operable to extract a representative value from the visual line measuring results of the last several frames, a visual line determining section 213 operable to determine the direction of the visual line, and a threshold determining section 214 operable to determine a threshold referred by the visual line determining section 213.

The visual line measuring result storing section 211 is operable to store therein the visual line measuring results of the last several frames. The number of the visual line measuring results stored in the visual line measuring result storing section 211 can be arbitrarily set. In this embodiment, the visual line measuring result storing section 211 is assumed to be operable to store therein the visual line measuring results of frames for 1 second.

The representative value extracting section 212 is operable to extract the representative value representing of the visual line measuring results of the last several frames from the previous visual line measuring results stored in the visual line measuring result storing section 211. In this embodiment, the representative value extracting section 212 is operable to extract a center value of the visual line measuring results stored in the visual line measuring result storing section 211 as the representative value.

The visual line measuring results stored in the visual line measuring result storing section 211 are often have significant errors as shown in FIG. 13 as a surge current. Accordingly, the representative value extracting section 212 is operable to extract the center value of the visual line measuring results as the representative value so as to extract the representative value less affected by the errors included in the visual line measuring results.

The visual line determining section 213 is operable to determine the direction of the visual line. In detail, the visual line determining section 213 is adapted to calculate a difference between the visual line measuring result A measured by the visual line measurement section 202 and the representative value B.

The visual line determining section 213 is further adapted to judge whether or not the calculated difference D is lower than the threshold T. The visual line determining section 213 is adapted to determine the visual line measuring result A as the direction of the visual line when judging that the calculated difference D is lower than the threshold T. The visual line determining section 213 is, on the other hand, adapted to determine the representative value B as the direction of the visual line when judging that the calculated difference D is not lower than the threshold T, i.e., higher or equal to the threshold T.

The visual line determining section 213 is further adapted to output the determined direction of the visual line to the alert device as the visual line estimating result. The visual line determining section 213 may adapted to output the determined direction of the visual line directly to the alert device, and may adapted to output the determined direction of the visual line to the alert device after performing smoothing operation without delay by using of a time-series filter such as, for example, a means filter or a Kalman filter.

The threshold determining section 214 is operable to determine the threshold T on the basis of a maximum eyeball rotation angle P in a time period of a frame and a minimum angle Q of a difference D between the visual line at the time of detecting a true pupil and the visual line at the time of detecting a false pupil outside of a region of the true pupil.

Figure 4:
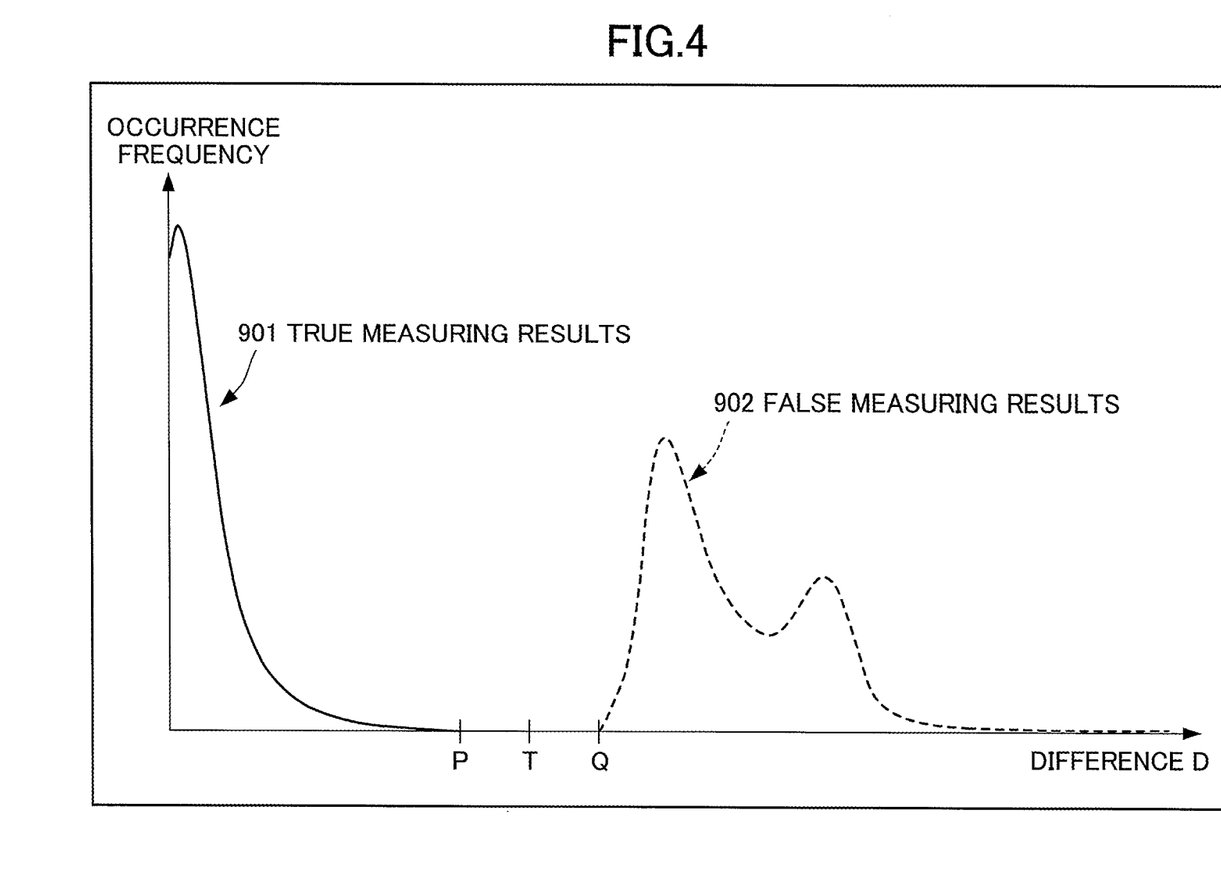
FIG. 4 is a graph showing relationships of differences between visual line measuring results and represent values of the visual line estimating apparatus according to the first embodiment of the present invention with occurrence frequencies of the respective differences.

The relationships of the maximum eyeball rotation angle P and the minimum angle Q with the threshold T will be described hereinafter with reference to FIG. 4. FIG. 4 is a typical example of a graph formed by a horizontal axis indicating the differences D and a vertical axis indicating occurrence frequencies of the respective differences when actual visual line measurement is achieved.

The solid line 901 indicates a graph at the time of true visual line measuring results, and the dashed line 902 indicates a graph at the time of false visual line measuring results by the detected false pupil outside of the region of the true pupil. The graphs lead to the fact that the maximum eyeball rotation angle P is considered as a maximum value of the solid line 901, and the minimum angle Q is considered as a minimum value of dashed line 902.

Thus, the fact that the minimum angle Q is higher than the maximum eyeball rotation angle P is generally known from experiment. Therefore, the fact that the threshold T is set between the maximum eyeball rotation angle P and the minimum angle Q leads to the fact that the judgment whether the differences D are calculated on the basis of true measuring results or false measuring results can be achieved.

Figure 5:
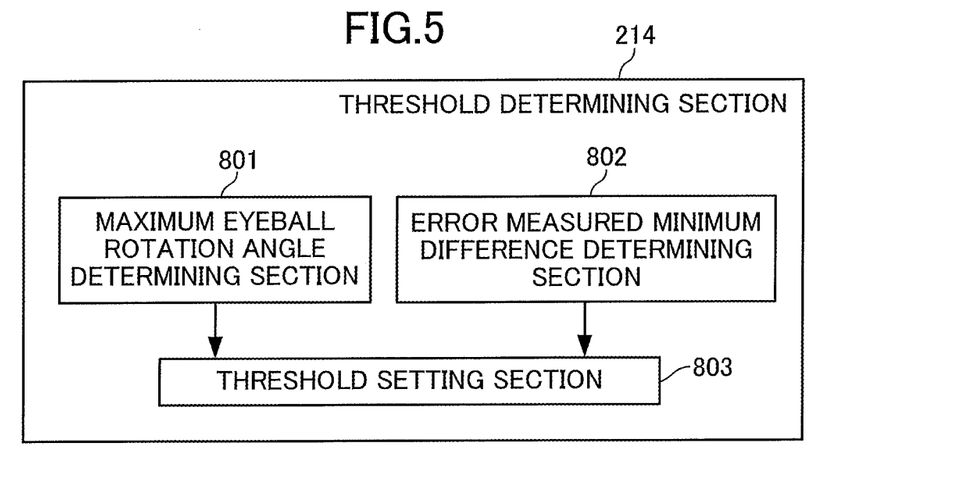
FIG. 5 is a block diagram showing a construction of a threshold determining section constituting the visual line estimating apparatus according to the first embodiment of the present invention.

As shown in FIG. 5, the threshold determining section 214 has a specific construction as comprising a maximum eyeball rotation angle determining section 801, an error measured minimum difference determining section 802 and a threshold setting section 803.

The maximum eyeball rotation angle determining section 801 is operable to determine the maximum eyeball rotation angle P. The maximum eyeball rotation angle P is considered as a constant value on the basis of a known value corresponding to an elastic speed of a muscle controlling eye movement. In detail, a general maximum eyeball rotation angle is known as 300 degrees per second. Therefore, in case that the visual line measurement is achieved with taking images for 30 frames per second, the maximum eyeball rotation angle P is considered as 10 degrees per frame.

The maximum eyeball rotation angle determining section 801 may be operable to adjust the maximum eyeball rotation angle P on the basis of the previously outputted results such as, for example, history of the visual line measuring results of the visual line measurement section 202 and history of the visual line estimating results of the visual line determining section 213.

For example, the maximum eyeball rotation angle determining section 801 may be operable to perform an operation to reduce a constant tiny value from the maximum eyeball rotation angle P in case that the maximum eyeball rotation angle P is too big in comparison with the previous history.

The error measured minimum difference determining section 802 is adapted to determine the minimum angle Q. It is known from experiment about the fact that, in case that the false pupil is detected outside of the region of the true pupil, the false pupil is almost detected on an outline of an iris or outside of the iris. Therefore, the error measured minimum difference determining section 802 is operable to determine the minimum angle Q by using of the known value.

Figure 6:
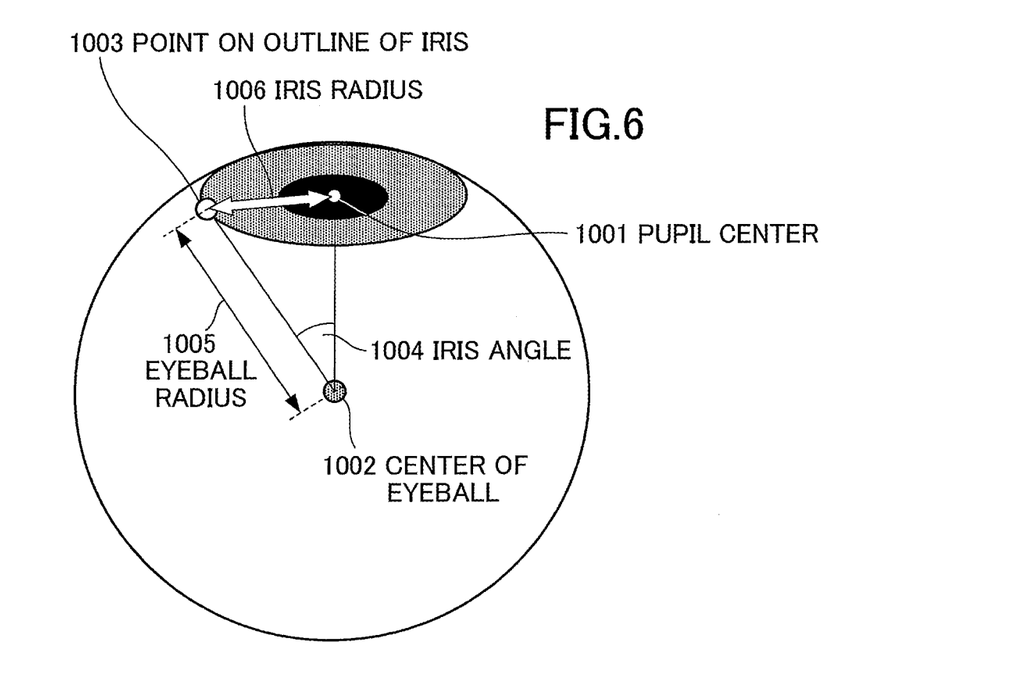
FIG. 6 is a conceptual diagram showing an eyeball.

As shown in detail in FIG. 6, the error measured minimum difference determining section 802 is adapted to calculate an iris angle 1004 between a line from the pupil center 1001 to the center 1002 of the eyeball and a line from a point 1003 on the outline of the iris to the center 1002 of the eyeball, and determine the minimum angle Q on the basis of the maximum eyeball rotation angle P and the calculated the iris angle 1004.

The iris angle 1004 is depended on an eyeball radius 1005 and an iris radius 1006, but considered as a constant value on the basis of a medical known value. This results from the fact that both of the eyeball radius 1005 and the iris radius 1006 rarely vary among individuals in general adult.

In general, the iris angle 1004 is 30 degrees by the reason that the iris radius 1006 is known as 6 mm, and the eyeball radius 1005 is known as 12 mm. The error measured minimum difference determining section 802 is adapted to take into account the maximum eyeball rotation angle P to determine the minimum angle Q. For example, the error measured minimum difference determining section 802 is adapted to determine the minimum angle Q as 20 degrees in case that the maximum eyeball rotation angle P is determined as 10 degrees.

The error measured minimum difference determining section 802 may be adapted to calculate the iris radius 1006 by image processing, and calculate the iris angle 1004 on the basis of the calculated iris radius 1006. For example, in FIG. 3, the error measured minimum difference determining section 802 may be adapted to extract pixels corresponding to the iris by grouping pixels each having a luminance lower than a constant luminance around the pupil center 404 detected by the visual line measurement section 202, and circularly approximate the extracted pixels to obtain the outline of the iris on the image.

In case that a focal length of the image inputting section 201, a pitch between pixels of the image sensor and a distance between the camera and the eye are known, an actual scale of the outline of the iris can be led from the face image 301. Therefore, the error measured minimum difference determining section 802 may be adapted to calculate the iris radius 1006 on the basis of the focal length of the image inputting section 201, the pitch between pixels of the image sensor and the distance between the camera and the eye.

In this case, the error measured minimum difference determining section 802 is adapted to calculate the distance between the camera and the eye by a stereo distance measurement operation with two camera known of positional relationships with each other.

The threshold setting section 803 is adapted to determine an arbitrary angle as the threshold T between the maximum eyeball rotation angle P and the minimum angle Q. In an example case that the maximum eyeball rotation angle P is determined as 10 degrees and the minimum angle Q is determined as 20 degrees, the threshold setting section 803 is adapted to determine the threshold T as 15 degrees.

The threshold setting section 803 may be adapted to vary the determined threshold T with taking account of an amount of movement of a head. For example, in case that the head is rotationally moved in the direction from side to side, the threshold setting section 803 may be operable to set the threshold T to heighten with taking account of high probability of a large amount of movement of the direction of the visual line. In this case, the threshold setting section 803 may be adapted to estimate the amount of movement of the head on the basis of amount of movement of the edges 402, 403 of the eye.

Figure 7:
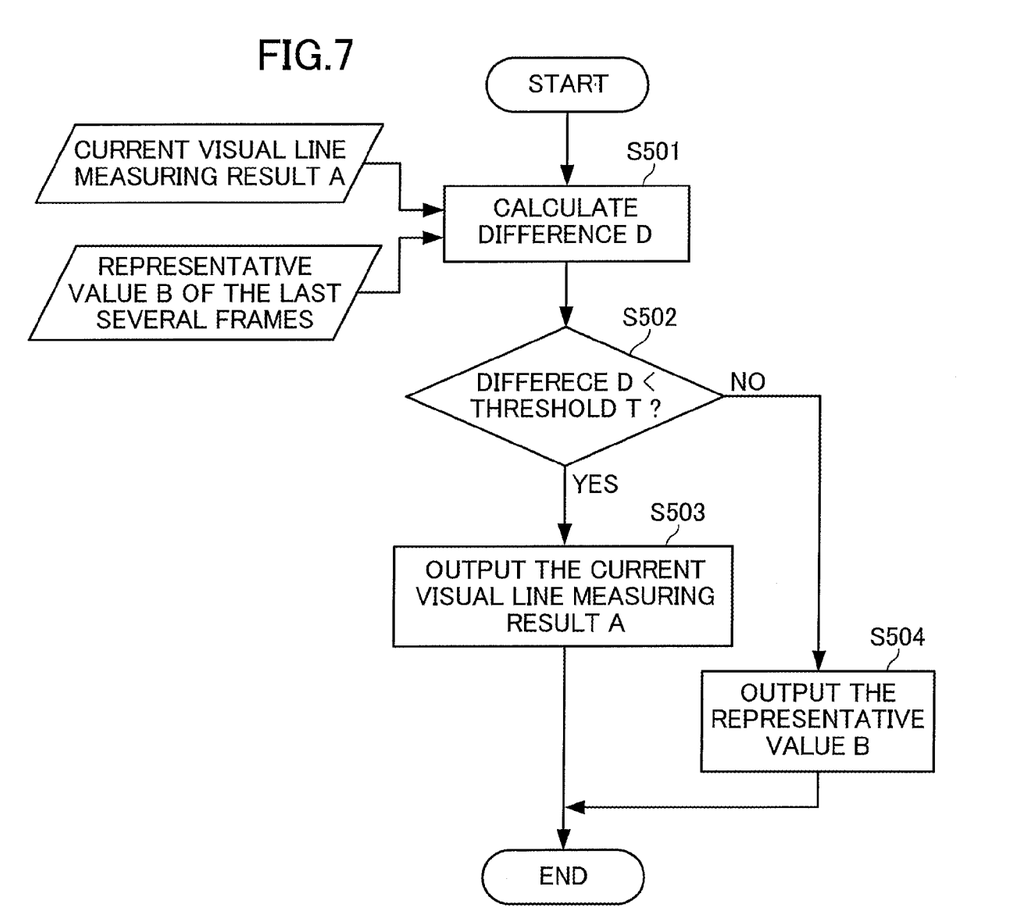
FIG. 7 is a flowchart showing an operation of a visual line determining section constituting the visual line estimating apparatus according to the first embodiment of the present invention.

The operation of the visual line determining section 213 constructed above mentioned will be described hereinafter with reference to the flowchart in FIG. 7.

The difference D between the visual line measuring result A of the visual line measurement section 202 and the representative value B extracted by the representative value extracting section 212 is firstly calculated by the visual line determining section 213 (in the step S501). The judgment is then made by the visual line determining section 213 whether or not the difference D is lower than the threshold T determined by the threshold determining section 214 (in the step S502).

If the judgment is made that the difference D is lower than the threshold T, the visual line measuring result A is outputted as the visual line estimating result from the visual line determining section 213 (in the step S503). On the other hand, if the judgment is made that the difference D is not lower than the threshold T, the representative value B is outputted as the visual line estimating result from the visual line determining section 213 (in the step S504).

The example of the visual line estimating results outputted form the visual line determining section 213 operating as mentioned above will be described hereinafter in detail with reference to FIG. 8. In case that the visual line measuring results A are plotted in time-series, some of the visual line measuring results A have the significant errors as shown in a graph 601, for example.

In case that the center value of the predetermined number of frames is extracted as the representative value of each frame shown in the graph 601, errors included in the visual line measuring results A are suppressed in the extracted representative value as shown in a graph 602.

When comparing the graphs 601 and 602, some points are found in a graph 603 where each difference D is higher or equal to the threshold T, thereby the visual line estimating results are obtained as shown in a graph 604. The graph 604 of the visual line estimating results is coincident with the graph 602 of the representative value, thereby the graph 604 indicates that the errors included in the visual line estimating results are suppressed.

The another example of the visual line estimating results outputted form the visual line determining section 213 will be described hereinafter with reference to FIG. 9. The fact that the direction of the virtual line varied at a constant rate is shown in a graph 701. In case that the center value of the predetermined number of frames is extracted as the representative value of each frame shown in the graph 701, the extracted representative value is varied as shown in a graph 702 similar to the graph 701.

When comparing the graphs 701 and 702, each difference D between points of the graphs 701 and 702 is constantly lower than the threshold T as shown in a graph 703, thereby the visual line estimating results is obtained as shown in a graph 704. The graph 704 of the visual line estimating results is coincident with the graph 701 of the visual line measuring results, thereby the graph 704 indicates that delay of the visual line estimating results is suppressed.

Figure 8:
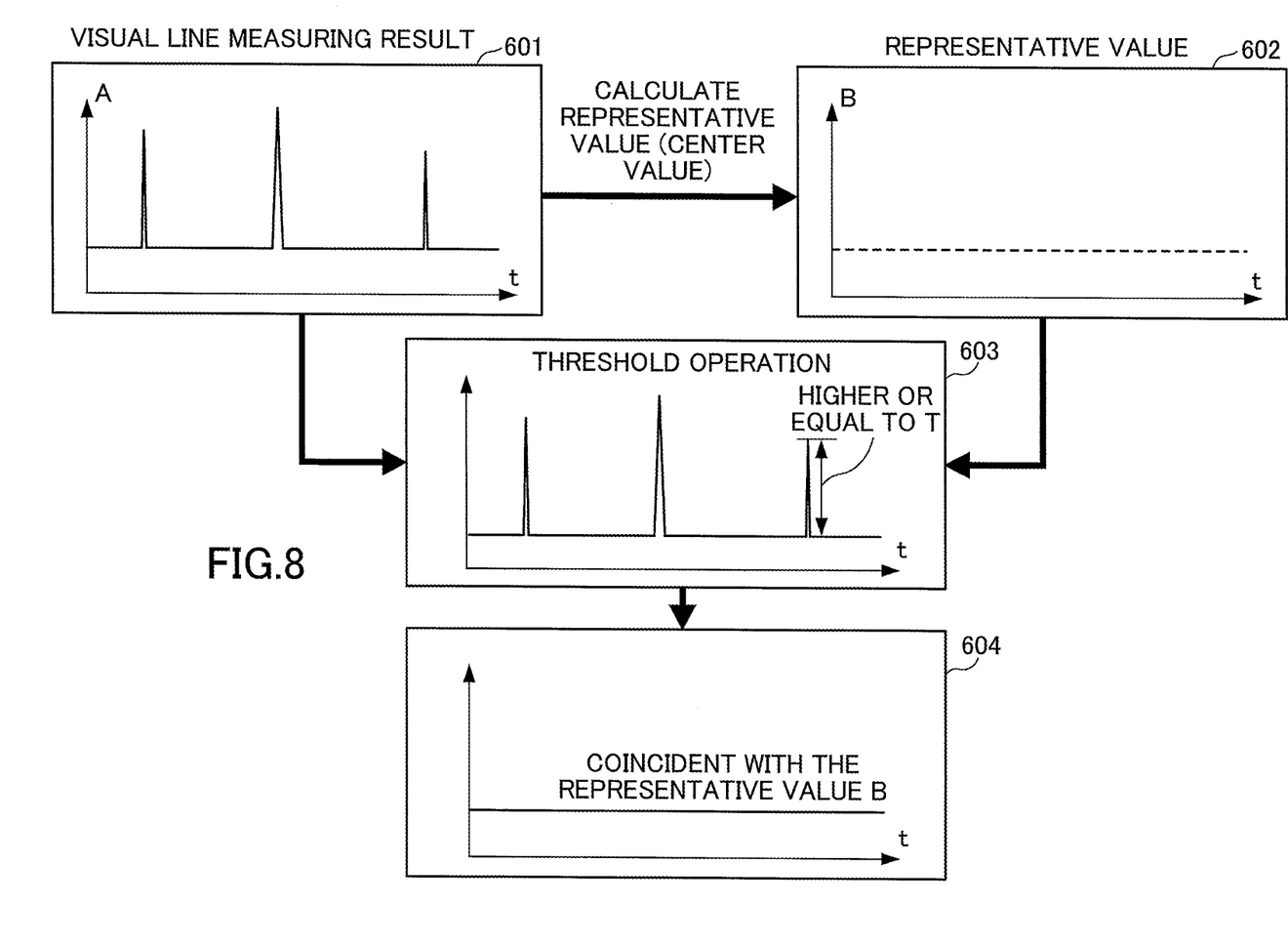
FIG. 8 is a conceptual diagram showing processing results of respective sections under the condition that the visual line is unmoving, the sections constituting the visual line estimating apparatus according to the first embodiment of the present invention.
Figure 9:
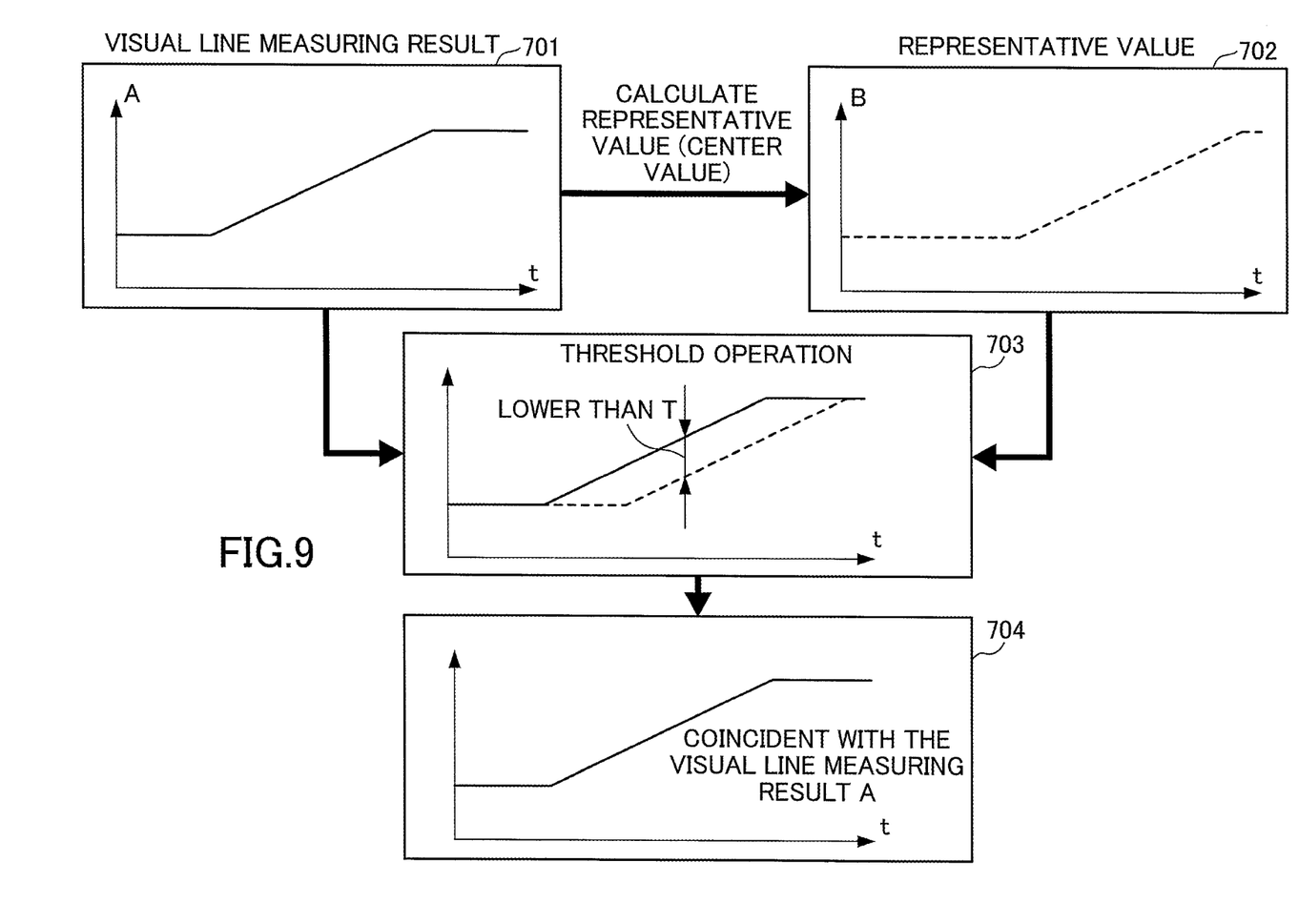
FIG. 9 is a conceptual diagram showing processing results of respective sections under the condition that the visual line is moving.

As previously mentioned, the visual line determining section 213 can suppress the significant errors included in the visual line estimating results as shown in FIG. 8, and suppress the errors included in the visual line estimating results without delay at the time of moving the visual line as shown in FIG. 9.

As will be seen from the foregoing description, it is to be understood that the visual line estimating apparatus 200 according to the first embodiment of the present invention is designed to determine the visual line measuring result A as the visual line estimating result in case that the difference D between the visual line measuring result A and the representative value B extracted by the representative value extracting section 212 is lower than the threshold T, and designed to determine the representative value B as the visual line estimating result in case that the difference D is higher or equal to the threshold T. The visual line estimating apparatus 200 can therefore obtain the high accurate visual line estimating result with the suppressed errors without delay, even if the visual line measuring result includes the significant errors caused by the false detection of the pupil.

Second Embodiment

Figure 10:
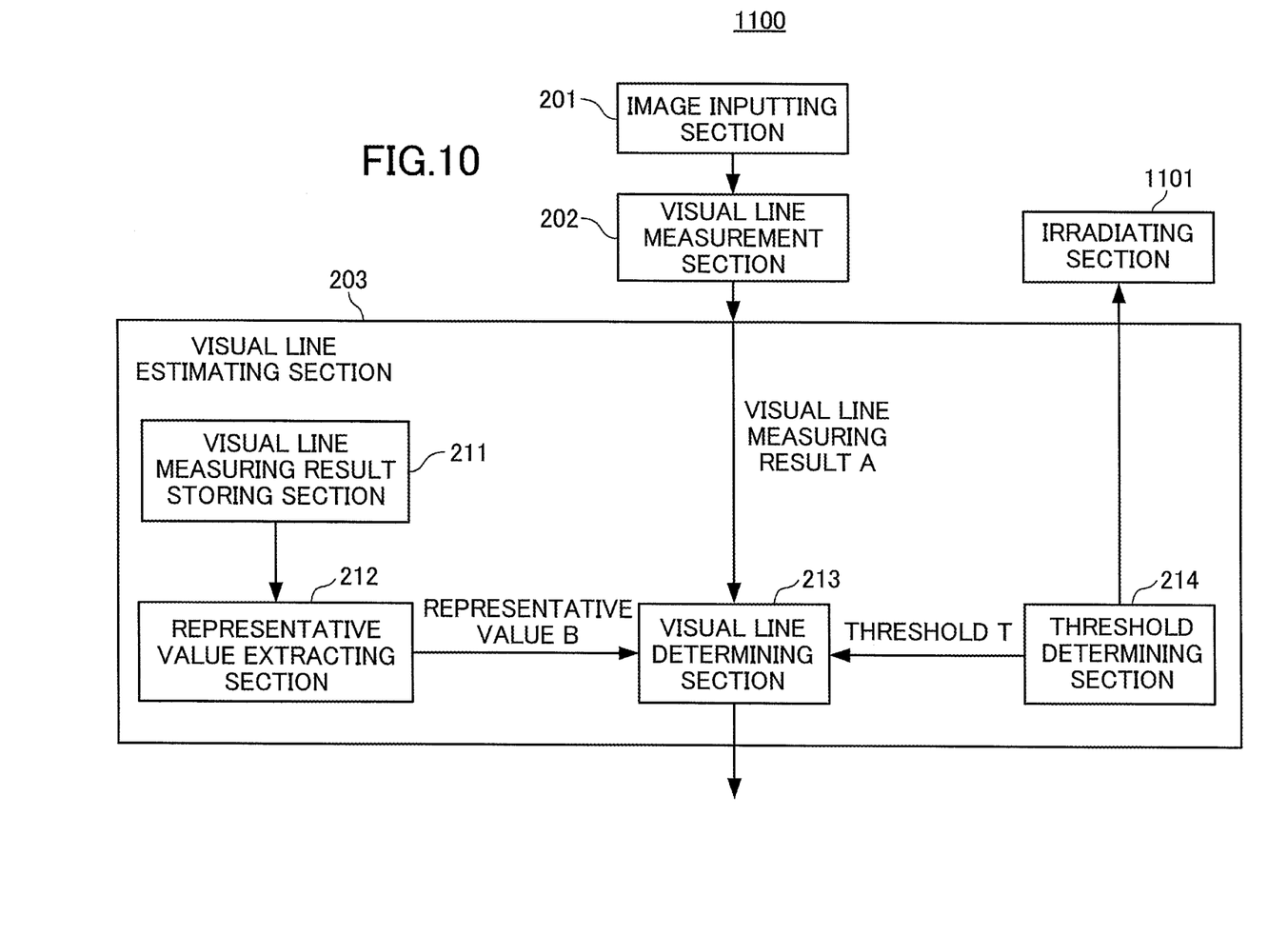
FIG. 10 is a block diagram showing a construction of a visual line estimating apparatus according to a second embodiment of the present invention.

As shown in FIG. 10, a visual line estimating apparatus 1100 according to the second embodiment of the present invention comprises an irradiating section 1101 operable to irradiate the region including the eye on the face of the driver in addition to the constructional elements of the visual line estimating apparatus 200 according to the first embodiment of the present invention.

The irradiating section 1101 is constituted by a lighting equipment irradiating with near-infrared light, and provided, for example, near the image inputting section 201 to have a light axis pass through the eye of the driver. The near-infrared light is invisible for the driver, but sensed by the image sensor such as, for example, CCD and CMOS. Therefore, the image inputting section 201 is capable of taking an image of the light irradiated from the irradiating section 1101 therewith and reflected by the face of the driver.

In this embodiment, the threshold determining section 214 is adapted to change a lighting state of the irradiating section 1101 in response to the timing of calculating the iris radius 1006 by the image processing so as to have the error measured minimum difference determining section 802 determine the iris angle 1004.

The irradiating section 1101 is adapted to stop irradiating at the time of receiving a timing signal indicating to start calculating the iris radius 1006 from the error measured minimum difference determining section 802 of the threshold determining section 214. Therefore, the image inputting section 201 is capable of taking the image under the condition that the driver is received only natural light including much visible light, and the error measured minimum difference determining section 802 is capable of calculating the iris angle 1004 by using of the image.

The irradiating section 1101 is, on the other hand, adapted to restart irradiating at the time of receiving a timing signal indicating to end calculating the iris radius 1006 from the error measured minimum difference determining section 802.

Figure 11:
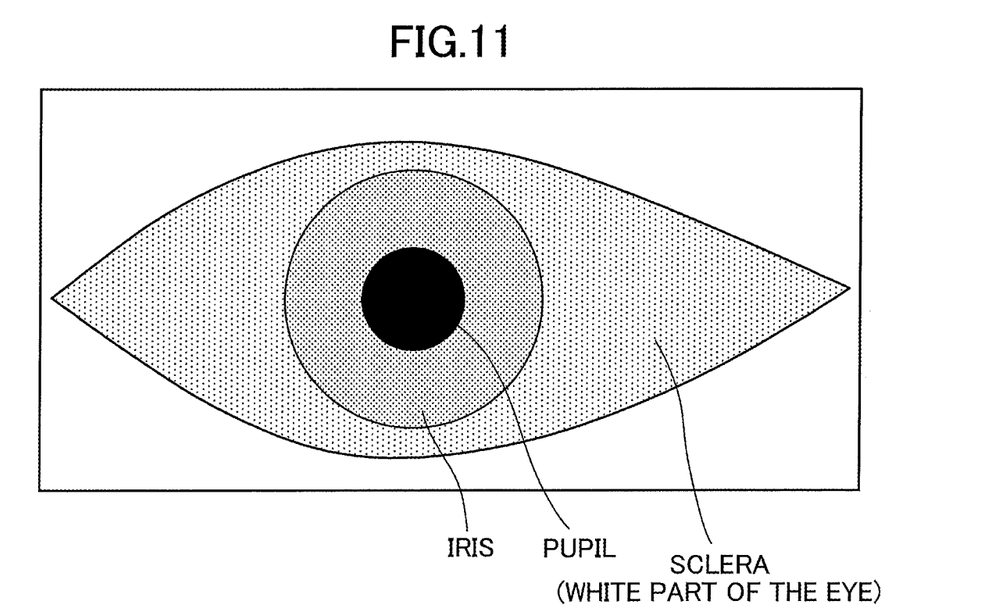
FIG. 11 is a conceptual diagram showing an inputted image of the visual line estimating apparatus according to the second embodiment of the present invention, the inputted image taken under near-infrared light.
Figure 12:
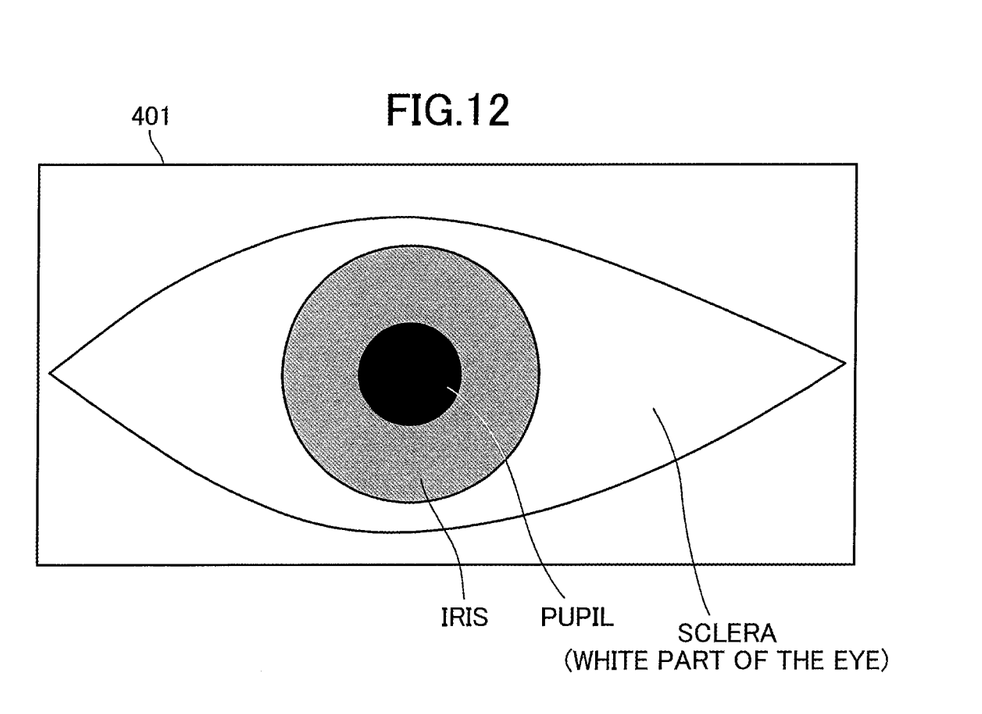
FIG. 12 is a conceptual diagram showing an inputted image of the visual line estimating apparatus according to the second embodiment of the present invention, the inputted image taken under visible light.

The reflectance by the iris of the visible light is lower than that of the visible light. Therefore, even if the luminance of the iris irradiated with the near-infrared light is high as shown in FIG. 11, the luminance of the iris irradiated with the visible light is low as shown in FIG. 12 and a luminance difference between the part of the iris and the part of a sclera (white part of the eye) is wide. Consequently, the calculation result of the iris radius 1006 can be stable by the irradiating section 1101 controlled as described above.

As will be seen from the foregoing description, it is to be understood that the visual line estimating apparatus 1100 according to the second embodiment of the present invention has the same advantage of the visual line estimating apparatus 200 according to the first embodiment of the present invention. In addition, the visual line estimating apparatus 1100 can stably obtain the high accurate visual line estimating result without delay, even if the iris radius 1006 is varied among different individuals.

While there have been described in the forgoing embodiments about the fact that the visual line estimating apparatus according to the present invention is constituted by software, the visual line estimating apparatus according to the present invention may be constituted by hardware. In this case, each section described in the forgoing embodiments is typically constituted by a LSI (Large Scale Integration). Each section may be constituted by each chip. The LSI may be called an IC (Integrated Circuit), a System LSI, a Super LSI or an Ultra LSI in dependence upon an integration degree.

The visual line estimating apparatus according to the present invention may be constituted by a dedicated circuit or a versatile processor as substitute for the LSI. For example, the visual line estimating apparatus according to the present invention may be constituted by an FGPA (Field Programmable Gate Array) programmable after production, or a Reconfigurable Processor reconfigurable of connections between inner circuit cells and configuration of each circuit cell.

Fatherly, in case that technology of integrated circuit instead of the LSI is realized by advancement of semiconductor technology and other derivative technology, each section constituting the visual line estimating apparatus according to the present invention may be obviously integrated by using of the technology.

INDUSTRIAL APPLICABILITY

The visual line estimating apparatus according to the present invention can output the high accurate visual line estimating result, thereby available for alerting to inattentive driving and detecting an oversight with a vehicle mounted camera. In addition, the visual line estimating apparatus according to the present invention has a wide range of application not only for a vehicle mounted equipment but also an audio-visual controller such as a television controller and a human behavioral analyzer with a surveillance camera.

REFERENCE SIGNS LIST 200, 1100 visual line estimating apparatus
201 image inputting section
202 visual line measurement section
203 visual line estimating section
211 visual line measuring result storing section
212 representative value extracting section
213 visual line determining section
214 threshold determining section
301 face image
302, 303, 402, 403 edge of an eye
401 eye region image
404, 1001 pupil center
601, 701 graph indicating visual line measuring results
602, 703 graph indicating representative values
603, 703 graph indicating results of an threshold operation
604, 704 graph indicating visual line estimating results
801 maximum eyeball rotation angle determining section
802 error measured minimum difference determining section
803 threshold setting section
901 graph indicating true measuring results
902 graph indicating false measuring results
1002 center of an eyeball
1003 point on an outline of an iris
1004 iris angle
1005 eyeball radius
1006 iris radius
1101 irradiating section

The invention claimed is:

1. A visual line estimating apparatus comprising:
    an image inputting section operable to take an image of a region including an eye on a face;
    a visual line measurement section operable to measure a direction of a visual line on the basis of the taken image;
    a visual line measuring result storing section operable to store therein visual line measuring results previously measured by the visual line measurement section;
    a representative value extracting section operable to extract a representative value from the visual line measuring results stored in the visual line measuring result storing section;
    a visual line determining section operable to judge whether or not a difference between the representative value extracted by the representative value extracting section and the visual line measuring result measured by the visual line measurement section is lower than a predetermined threshold T to determine a visual line estimating result from the representative value and the visual line measuring result; and a threshold determining section operable to determine the threshold T, wherein the threshold determining section is operable to determine the threshold T between a maximum eyeball rotation angle P and a minimum angle Q after setting the maximum eyeball rotation angle P indicating a possible travel angle of the visual line in a time period of a frame and setting the minimum angle Q indicating an angular difference D between the visual line at the time of detecting a true pupil and the visual line at the time of detecting a false pupil outside of a region of the true pupil.

2. The visual line estimating apparatus as set forth in claim 1, wherein the threshold determining section is adapted to set the maximum eyeball rotation angle P on the basis of a known value corresponding to an elastic speed of a muscle controlling eye movement.

3. The visual line estimating apparatus as set forth in claim 2, wherein the threshold determining section is adapted to adjust the maximum eyeball rotation angle P on the basis of the previous results outputted from at least one of the visual line measurement section and the visual line determining section.

4. The visual line estimating apparatus as set forth in claim 1, wherein the threshold determining section is adapted to set the minimum angle Q on the basis of the maximum eyeball rotation angle P and an angle between a line from a center of the pupil to a center of the eyeball and a line from a point on an outline of an iris to the center of the eyeball.

5. The visual line estimating apparatus as set forth in claim 1, wherein the representative value extracting section is operable to extract a center value of the visual line measuring results stored in the visual line measuring result storing section as the representative value.

6. The visual line estimating apparatus as set forth in claim 4, wherein the threshold determining section is adapted to calculate an iris radius and calculate the angle between the line from the center of the pupil to the center of the eyeball and the line from the point on the outline of the iris on the basis of the calculated iris radius to the center of the eyeball.

7. The visual line estimating apparatus as set forth in claim 6, further comprising an irradiating section operable to irradiate the region including the eye on the face, wherein the threshold determining section is operable to have the irradiating section change the state of irradiating at the time of calculating the iris radius.

8. The visual line estimating apparatus as set forth in claim 1, further comprising a time-series filter operable to smooth the value determined by the visual line determining section.

* * * * *